United States Patent
Kunz et al.

(10) Patent No.: US 9,957,696 B2
(45) Date of Patent: May 1, 2018

(54) TOOL RETENTION SYSTEM

(71) Applicant: Caterpillar Inc., Peoria, IL (US)

(72) Inventors: Phillip John Kunz, Morton, IL (US);
Patrick Simon Campomanes, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days. days.

(21) Appl. No.: 15/076,904

(22) Filed: Mar. 22, 2016

(65) Prior Publication Data
US 2016/0305097 A1  Oct. 20, 2016

Related U.S. Application Data

(60) Provisional application No. 62/149,161, filed on Apr. 17, 2015.

(51) Int. Cl.
*E02F 9/28* (2006.01)
*F16B 37/14* (2006.01)
*F16B 37/08* (2006.01)

(52) U.S. Cl.
CPC ............ *E02F 9/2833* (2013.01); *F16B 37/14* (2013.01); *F16B 37/0864* (2013.01)

(58) Field of Classification Search
CPC ....... E02F 9/2833; E02F 9/2825; F16B 37/14; F16B 23/00; F16B 23/003; F16B 23/0061
USPC .................................................. 37/455, 456
See application file for complete search history.

(56) References Cited

U.S. PATENT DOCUMENTS

| | | | |
|---|---|---|---|
| 3,507,182 A | 4/1970 | Tinnerman | |
| 4,136,598 A * | 1/1979 | Hughes | F16B 37/14 411/372 |
| 4,180,926 A | 1/1980 | Klett et al. | |
| 4,317,300 A | 3/1982 | Emrich et al. | |
| 4,701,089 A * | 10/1987 | Nettel | F16B 37/14 411/373 |
| 5,017,068 A * | 5/1991 | Cooksey | F16B 23/0061 403/282 |
| 5,082,409 A | 1/1992 | Bias | |
| 5,452,529 A | 9/1995 | Neuenfeldt et al. | |
| 6,302,630 B1 * | 10/2001 | Grant | A47G 3/00 411/372.6 |

(Continued)

FOREIGN PATENT DOCUMENTS

| WO | WO 2011/069183 A1 | 6/2011 |
|---|---|---|
| WO | WO 2013/037011 A1 | 3/2013 |

OTHER PUBLICATIONS

U.S. Patent Application of Phillip John Kunz, titled "Lip for Machine Bucket," filed Mar. 22, 2016.

(Continued)

*Primary Examiner* — Matthew D. Troutman
(74) *Attorney, Agent, or Firm* — Finnegan, Henderson, Farabow, Garrett & Dunner LLP

(57) ABSTRACT

A cap for removably attaching to a head of a fastener includes a main body having an open end and defining a hollow interior. The cap also includes an end section forming a closed end of the main body. The cap further includes a hollow inner portion connecting to an inner surface of the end section and extending through the hollow interior toward the open end of the main body. The inner portion is spaced from the main body, and the inner portion has a distal end configured to be inserted into an opening in the head of the fastener.

12 Claims, 10 Drawing Sheets

(56) References Cited

U.S. PATENT DOCUMENTS

| | | | |
|---|---|---|---|
| 6,802,681 B2* | 10/2004 | Cheal | F16B 5/02 |
| | | | 411/429 |
| 6,848,203 B2 | 2/2005 | Hohmann et al. | |
| 6,990,760 B1 | 1/2006 | Zaayman et al. | |
| 7,457,648 B2* | 11/2008 | Katou | F16B 37/14 |
| | | | 379/433.11 |
| 7,832,129 B2 | 11/2010 | Briscoe | |
| 8,210,785 B1* | 7/2012 | Gager | E03D 11/16 |
| | | | 411/338 |
| 8,434,248 B2 | 5/2013 | Woerman et al. | |
| 8,458,931 B2* | 6/2013 | Knight | E02F 9/2833 |
| | | | 37/456 |
| 8,720,088 B2 | 5/2014 | Knight | |
| 8,844,175 B2 | 9/2014 | Snyder | |
| 8,950,091 B2 | 2/2015 | Cover | |
| 9,200,433 B2* | 12/2015 | Tasovski | E02F 9/2841 |
| 9,228,325 B2* | 1/2016 | Campomanes | E02F 9/2825 |
| 2006/0030214 A1* | 2/2006 | Katou | F16B 37/14 |
| | | | 439/607.01 |
| 2007/0245601 A1 | 10/2007 | Bearden et al. | |
| 2013/0008062 A1 | 1/2013 | Guimaraes et al. | |
| 2013/0247429 A1 | 9/2013 | Campomanes | |
| 2013/0318840 A1 | 12/2013 | Ollinger, IV et al. | |
| 2014/0196324 A1 | 7/2014 | Carpenter et al. | |
| 2014/0202050 A1 | 7/2014 | Briscoe et al. | |
| 2014/0259809 A1 | 9/2014 | Campomanes et al. | |
| 2014/0366408 A1 | 12/2014 | Campomanes | |
| 2015/0013197 A1 | 1/2015 | Campomanes | |
| 2015/0096207 A1 | 4/2015 | Tasovski | |
| 2015/0211214 A1* | 7/2015 | Dallard | E02F 9/2833 |
| | | | 37/456 |
| 2016/0312816 A1* | 10/2016 | Bjelobradic | F16B 23/0038 |

OTHER PUBLICATIONS

U.S. Patent Application of Phillip John Kunz, titled "Tool Retention System," filed Mar. 22, 2016.

* cited by examiner

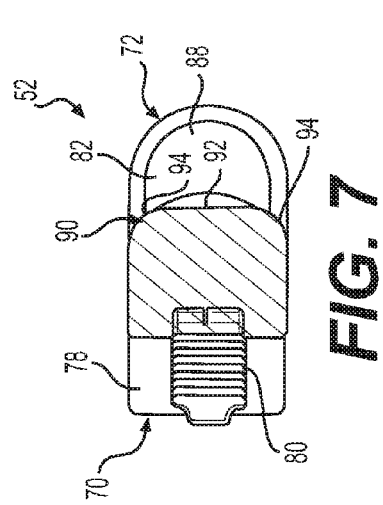
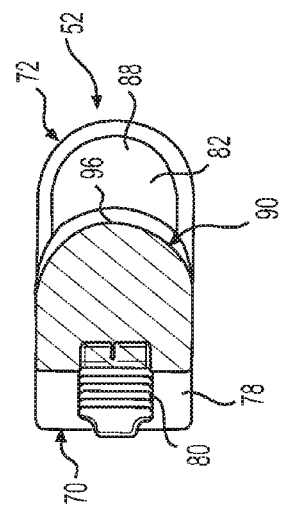
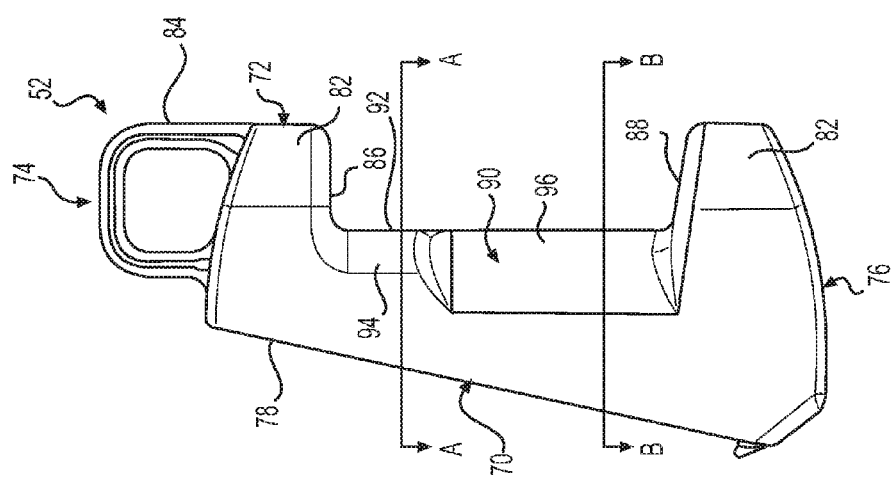
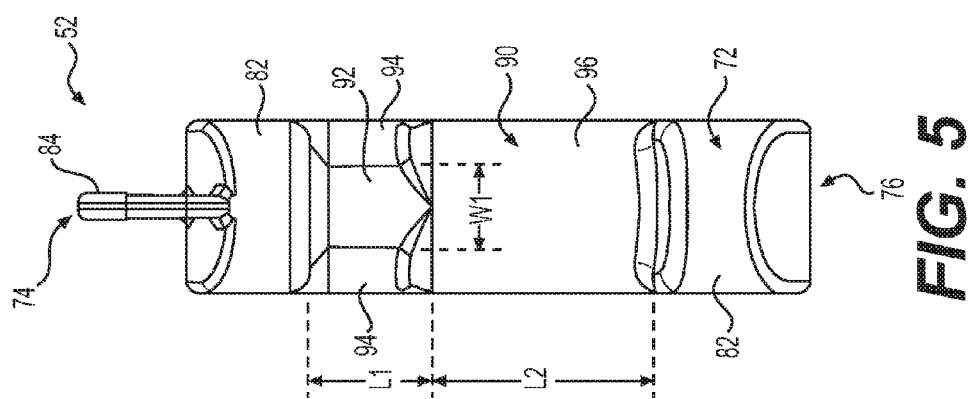

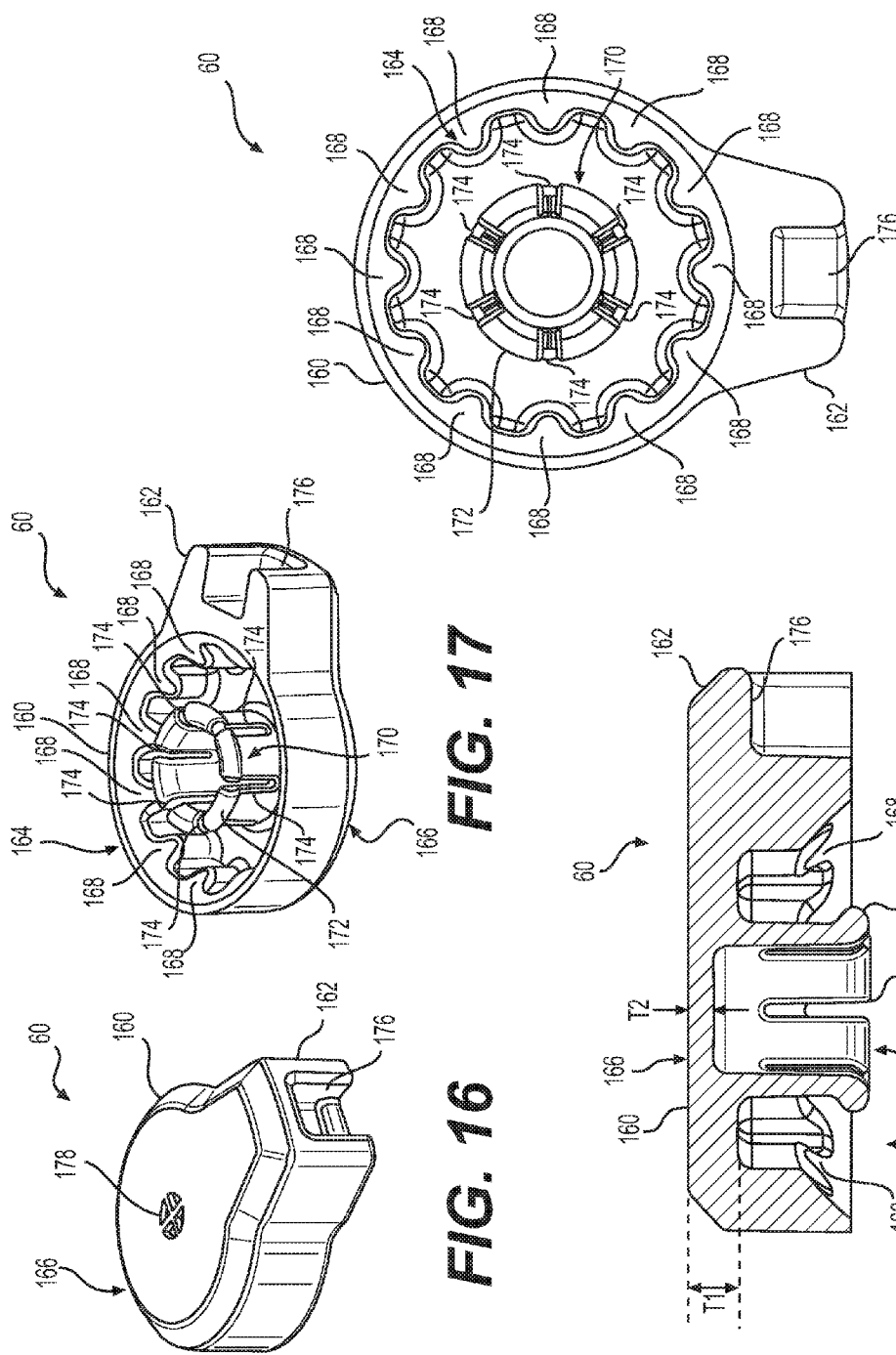

TOOL RETENTION SYSTEM

RELATED APPLICATION

This application is based on and claims benefit of priority of U.S. Provisional Patent Application No. 62/149,161, filed Apr. 17, 2015, which is incorporated herein by reference.

TECHNICAL FIELD

The present disclosure relates generally to a retention system and, more particularly, to a system for retaining a ground engaging tool connected to a work implement.

BACKGROUND

Earth-working machines, such as, for example, draglines, may be used for digging or ripping into the earth or rock and/or moving loosened material from one place to another. These machines may include a bucket for excavating or moving the material. The bucket can be subjected to extreme wear from abrasion and impacts experienced during the earth-working applications.

The bucket may include a lip including a plurality of noses projecting from a front edge of the lip. The lip may also include wing plates located at opposite sides of the lip. Various wear components may be coupled to the lip to protect the front edge of the lip. For example, teeth may be mountable to the noses, lip shrouds may be mountable between the noses, and wing shrouds may be mountable to the wing plates. The wear components may be releasably secured to the lip by retention systems, such as retaining members or locking pin systems.

An example of a retention system for retaining a wear member on an adapter secured to a bucket is described in International Publication No. WO 2013/037011 (the '011 publication). Specifically, the '011 publication discloses a lock assembly that includes a locking pin and a retaining member. The retaining member includes a tapered aperture that receives and retains a threaded portion of the locking pin. The retaining member also includes a detent that extends outwardly from a body of the retaining member and that prevents rotation of the retaining member in use.

While the retaining member of the '011 publication may retain the wear member on the adapter, it may still be less than optimal. For example, the retaining member may not provide a sufficiently secure attachment to other types of locking pins or fasteners, and may be difficult to remove when desired.

The disclosed system is directed to overcoming one or more of the problems set forth above.

SUMMARY

In one aspect, the present disclosure is directed to a cap for removably attaching to a head of a fastener. The cap includes a main body having an open end and defining a hollow interior. The cap also includes an end section forming a closed end of the main body. The cap further includes a hollow inner portion connecting to an inner surface of the end section and extending through the hollow interior toward the open end of the main body. The inner portion is spaced from the main body, and the inner portion has a distal end configured to be inserted into an opening in the head of the fastener.

In another aspect, the present disclosure is directed to a fastening system including a fastener including a head on one end. The head includes an opening. The fastening system also includes a cap removably attached to the head of the fastener. The cap includes a main body having an open end and defining a hollow interior. The cap also includes an end section forming a closed end of the main body. The cap further includes a hollow inner portion connecting to an inner surface of the end section and extending through the hollow interior toward the open end of the main body. The inner portion is spaced from the main body, and the inner portion has a distal end configured to be inserted into the opening in the head of the fastener.

In another aspect, the present disclosure is directed to a retention system for clamping a tool to a work implement. The retention system includes a clamp configured to be disposed within an aperture in the work implement and an aperture in the tool to clamp the tool to the work implement. The retention system also includes a wedge assembly located between the clamp and a surface of the aperture in the work implement. The wedge assembly is adjustably positionable with respect to the clamp. The wedge assembly includes a wedge including a recess and a fastener disposed within the recess in the wedge. The fastener is configured to adjust a position of the wedge with respect to the clamp and includes a head on one end. The head includes an opening. The wedge assembly also includes a cap removably attached to the head of the fastener. The cap includes a main body having an open end and defining a hollow interior, an end section forming a closed end of the main body, and a hollow inner portion connecting to an inner surface of the end section. The inner portion extends toward the open end of the main body and is spaced from the main body. The inner portion has a distal end configured to be inserted into the opening in the head of the fastener.

BRIEF DESCRIPTION OF THE DRAWINGS

FIG. 5 is a rear view of the clamp of FIG. 4;

FIG. 6 is a side view of the clamp of FIG. 4;

FIG. 7 is a cross-sectional view of the clamp of FIG. 4 taken along the line A-A of FIG. 6;

FIG. 8 is a cross-sectional view of the clamp of FIG. 4 taken along the line B-B of FIG. 6;

FIGS. 16 and 17 are perspective views of a closed end and an open end, respectively, of the cap of FIG. 14;

FIG. 18 is a cross-sectional view of the cap of FIG. 14; and

FIG. 19 is a bottom view of the cap of FIG. 14.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
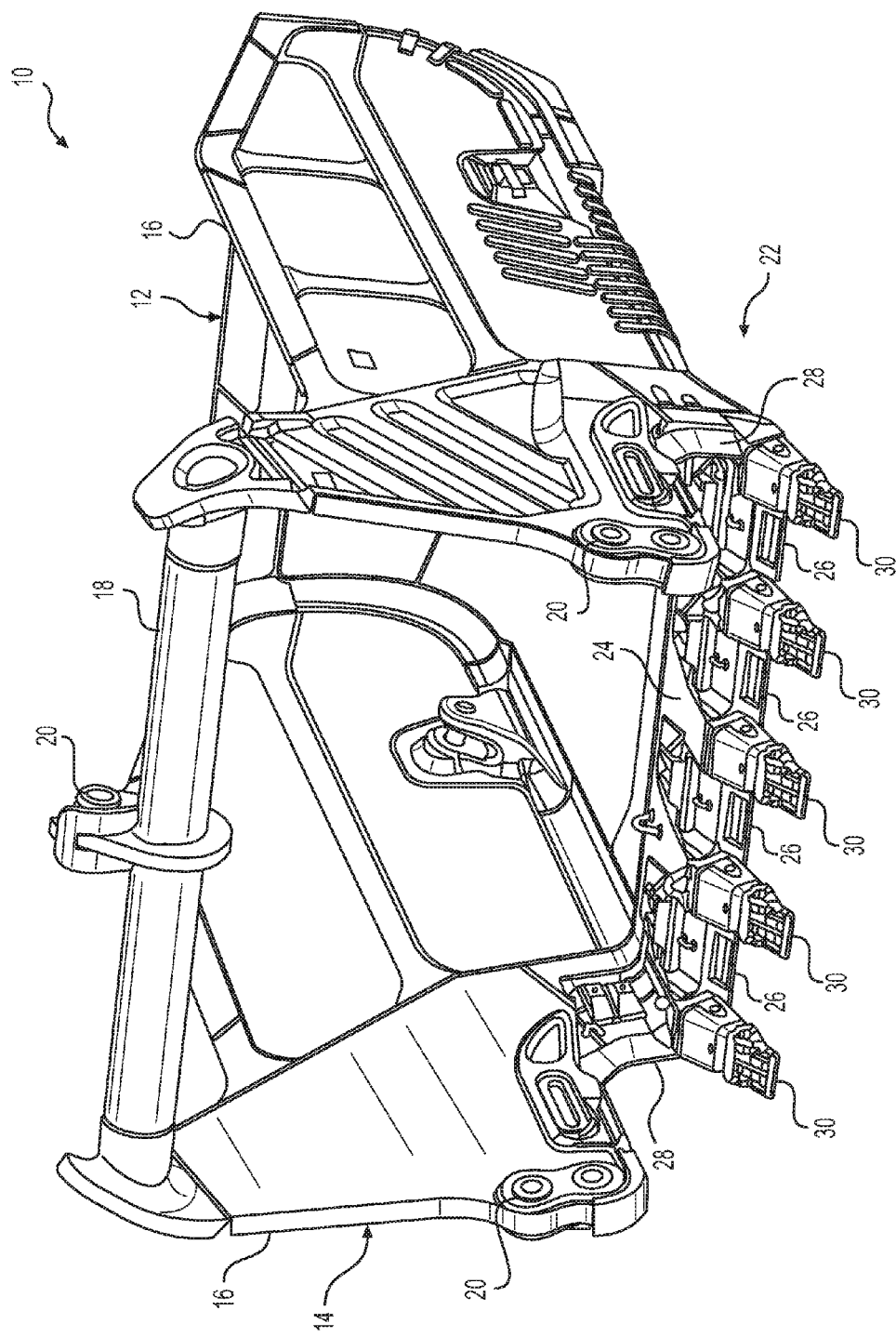
FIG. 1 is a perspective view of a bucket including a lip, lip shrouds, wing shrouds, and retention systems, according to an exemplary embodiment.

An exemplary embodiment of a work implement, e.g., a machine bucket 10, is illustrated in FIG. 1. In the exemplary embodiment, the bucket 10 may be attached to a dragline (not shown) that is configured to remove material, such as earthen material, with the bucket 10. The dragline may manipulate the bucket 10 by utilizing a hoist mechanism (not shown) and a drag mechanism (not shown) that are controlled by an operator in a machine cabin (not shown) of the dragline. Alternatively, the bucket 10 may be attached to other types of machines known in the art, such as excavators or other earth-working machines. As another alternative, the work implement may embody any device used to perform a task assigned to a machine.

The bucket 10 may include a main body 12, which may be a box-like structure with an open top, and an open front end 14 through which the material may pass to enter the main body 12. The main body 12 may include side walls 16 that are connected by a cross beam 18. The bucket 10 may include one or more connecting mechanisms 20, e.g., one or more brackets, for connecting to chains or cables used for manipulating the bucket 10. For example, the cross beam 18 may include one or more of the connecting mechanisms 20 for connecting to one or more chains associated with the hoist mechanism, and the side walls 16 may include one or more of the connecting mechanisms 20 for connecting to one or more chains for the drag mechanism.

The bucket 10 may include a wear assembly 22 attached to the main body 12 of the bucket 10, e.g., by welding, and may be replaceable. The wear assembly 22 may include a lip 24 and one or more ground engaging tools (GET) attached to the lip 24, such as one or more lip shrouds 26, one or more wing shrouds 28, and/or a plurality of teeth 30.

Figure 2:
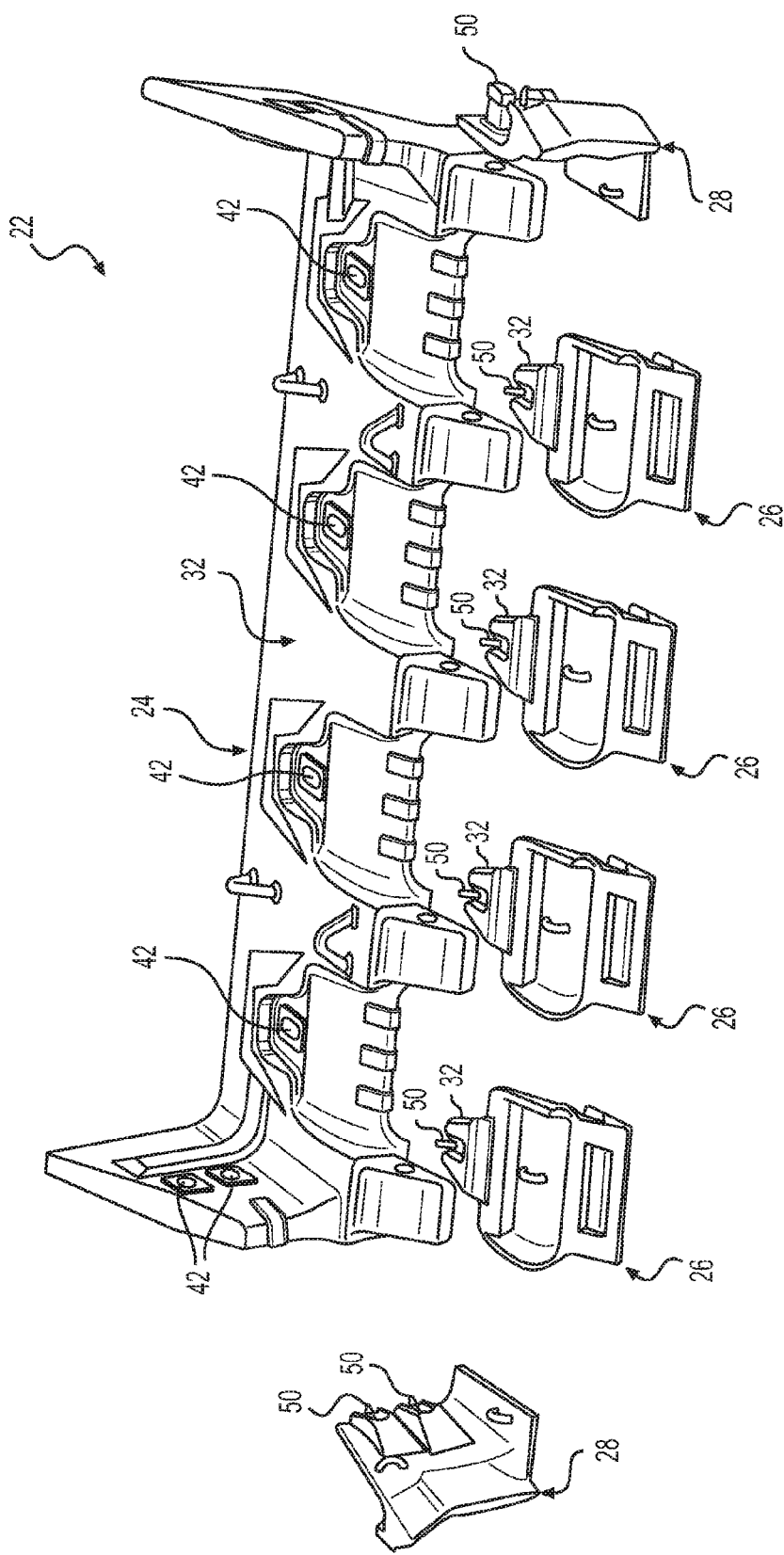
FIG. 2 is an exploded perspective view of the lip, lip shrouds, wing shrouds, and retention systems of FIG. 1.

FIG. 2 is an exploded view of the wear assembly 22, excluding the teeth 30, according to an exemplary embodiment. The lip 24 may also include one or more noses that project forwardly from a front edge of the lip 24, and the teeth 30 may attach directly or indirectly (e.g., via adapters or couplers) to the noses. In an embodiment, the teeth 30 may be two-piece components including a tip that may be connected to an adapter, e.g., by welding, a coupler, or other retaining system. The adapters may be removably connected to the respective noses via a locking pin or other retention system, such as the retention system described below. Alternatively, the GET (e.g., the lip shrouds 26, the wing shrouds 28, and/or the teeth 30) may take any form known in the art, such as, for example, a single-piece component or multi-piece component that is removably connected to the noses, such as a fork or other multi-point configuration, a chisel or blade configuration, a blunt-end configuration, or other single-point configuration.

The terms "front" and "rear" are used herein to refer to the relative positions of the components of the exemplary wear assembly 22. When used herein, "front" refers to one side of the wear assembly 22, e.g., closer to the tips of the noses of the lip 24 and/or the teeth 30 attached to the noses. In contrast, "rear" refers to the side of the wear assembly 22 that is opposite the front side. The rear side of the wear assembly 22 may be the side that is connected to the main body 12 of the bucket 10 when the wear assembly 22 is attached to the main body 12.

The lip shrouds 26 and the wing shrouds 28 may protect the front edge of the lip 24. The lip shrouds 26 may be mountable on the lip 24 between the noses, and the wing shrouds 28 may be mountable on wing plate portions of the lip 24 that extend upward (e.g., vertically or at an angle that is generally upward) relative to a central plate portion. As shown in FIGS. 1 and 2, the wear assembly 22 may include five teeth 30 that are spaced apart along the length of the lip 24, four lip shrouds 26 that are located between adjacent teeth 30, and two wing shrouds 28. Each of the teeth 30, the lip shrouds 26, and the wing shrouds 28 may be replaceable and designed to protect a different portion of the lip 24 from abrasive wear. Alternatively, other numbers of the teeth 30, the lip shrouds 26, and the wing shrouds 28 may be provided, depending on the application.

Each of the lip shrouds 26 and the wing shrouds 28 may include a front edge portion that hooks over the front edge of the lip 24. Each of the lip shrouds 26 and the wing shrouds 28 may also include a mounting portion 32 configured to receive a retention system 50 for clamping or attaching the respective lip shroud 26, wing shroud 28, or other GET in a removable manner to the lip 24 or other portion of a work implement.

Figure 3:
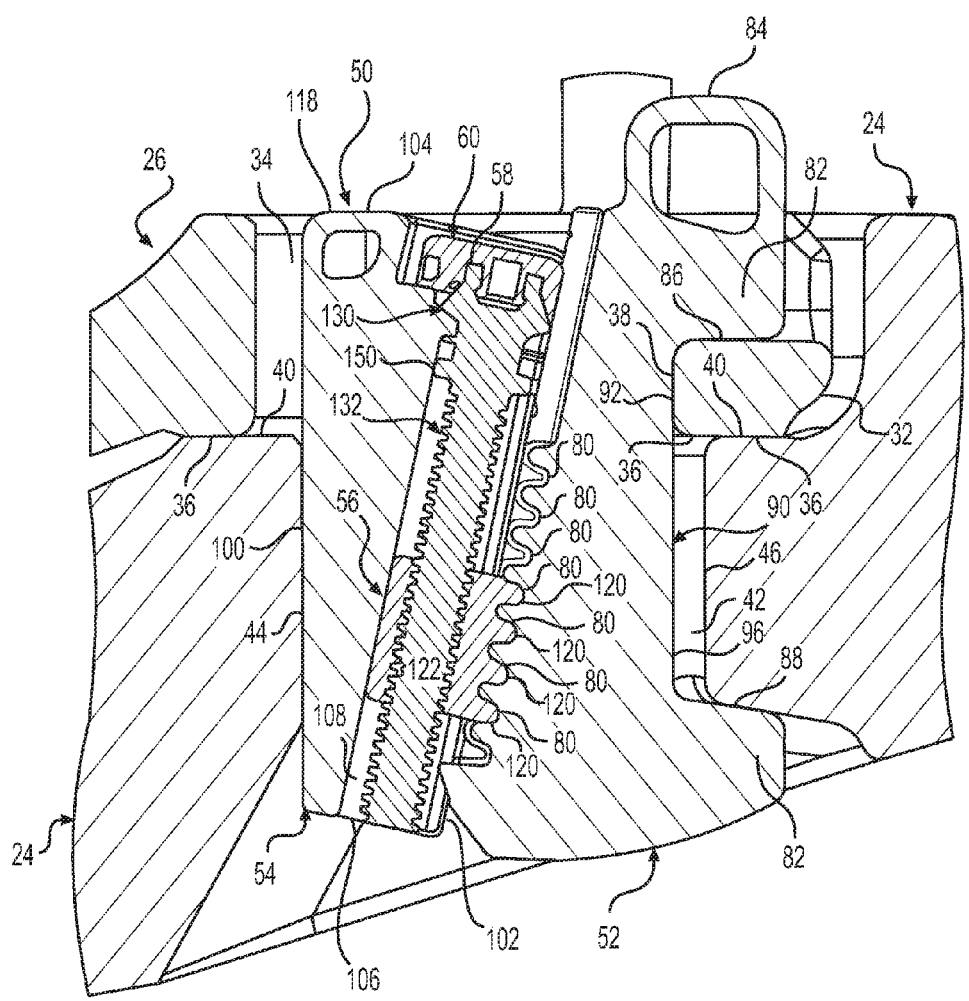
FIG. 3 is a cross-sectional view of one of the retention systems of FIG. 1 attaching one of the lip shrouds to the lip.

FIG. 3 shows an exemplary embodiment of the retention system 50 for attaching one of the lip shrouds 26 to the lip 24. The retention system 50 for retaining the wing shroud 28 or other GET on the lip 24 or other portion of the work implement may be similar or identical to the retention system 50 for retaining the lip shroud 26 on the lip 24. It is understood that the disclosed embodiment of the retention system 50 may also be used to retain the wing shroud 28 or other GET on the lip 24 or other portion of the work implement in a similar or identical manner.

The mounting portion 32 of the lip shroud 26 may include one or more apertures 34 and a bottom surface 36 that may be generally flat. The aperture 34 may receive the retention system 50, which may contact a rear surface 38 of the aperture 34, as will be described below. The retention system 50 may form a clearance with respect to a forward surface of the aperture 34. Although the disclosed embodiment of the lip shroud 26 includes a single aperture 34, it is understood that the lip shroud 26, the wing shroud 28, or other GET may include a plurality of apertures 34 for receiving a corresponding number of retention systems 50. For example, as shown in FIG. 2, two retention systems 50 may be provided to retain each wing shroud 28 on the lip 24.

The lip 24 may include one or more generally flat mounting surfaces 40 at least partially surrounding one or more apertures 42. The apertures 42 in the lip 24 may align with the apertures 34 in the lip shrouds 26, the wing shrouds 28, and/or other GET positioned on the lip 24. As shown in FIG. 2, the lip 24 may include four of the apertures 42 configured to receive four retention systems 50 for attaching four lip shrouds 26 to the lip 24, and two pairs of the apertures 42 configured to receive two pairs of retention systems 50 (each pair attaching one wing shroud 28). When the lip shroud 26 is positioned on the lip 24, the generally flat bottom surface 36 of the mounting portion 32 of the lip shroud 26 may be supported by the generally flat mounting surface 40 of the lip 24, and the aperture 34 in the lip shroud 26 may align with the corresponding aperture 42 in the lip 24. The aperture 42 in the lip 24 may also receive the retention system 50, which may contact a forward surface 44 of the aperture 42 and which may form a clearance with respect to a rear surface 46 of the aperture 42, as will be described below.

In an embodiment, the retention system 50 may include a clamp 52 and a wedge assembly. The wedge assembly may include a wedge 54, a slider 56, a fastener 58, and a cap 60. The wedge assembly may be located between the clamp 52 and the forward surface 44 of the aperture 42 in the lip 24. The wedge assembly may be adjustably positionable with respect to the clamp 52, as will be described below.

Figure 4:
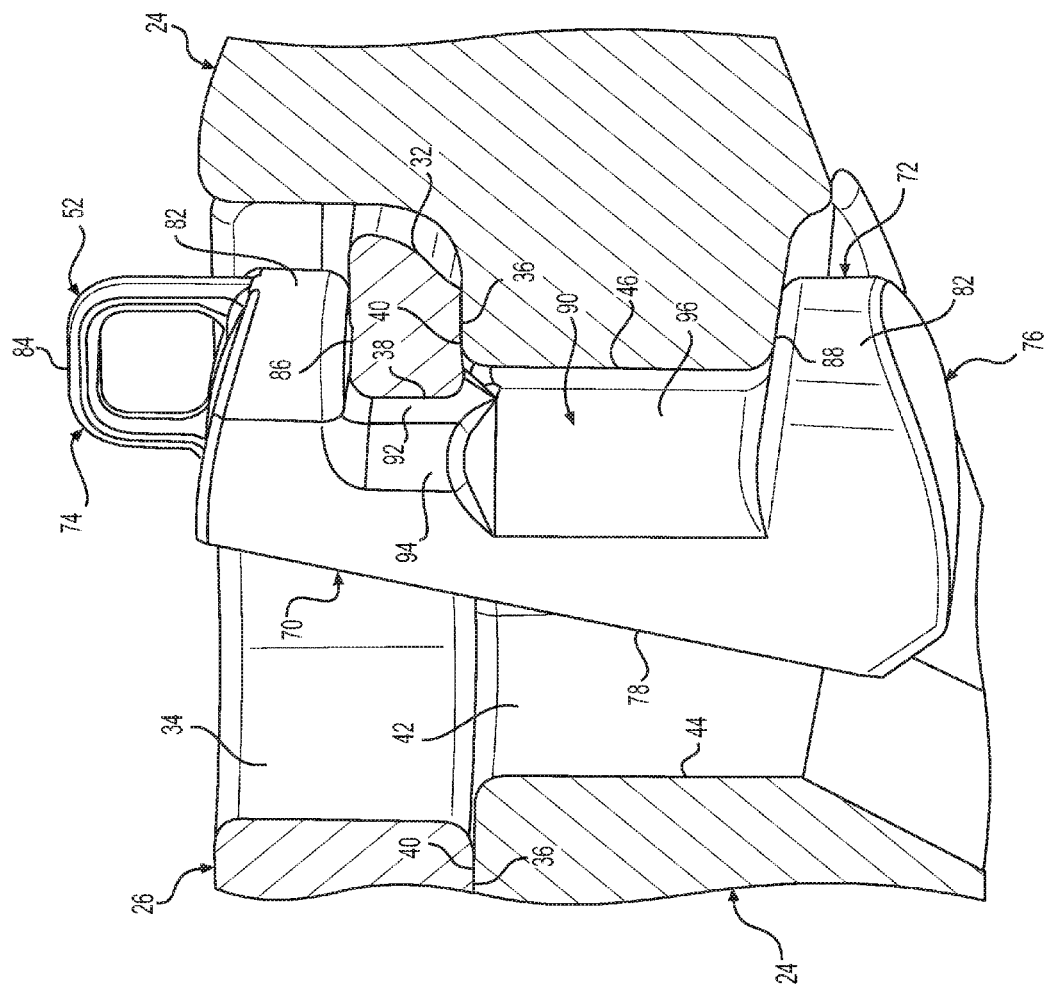
FIG. 4 is a cross-sectional view of a clamp of the retention system of FIG. 3 positioned on the lip shroud and the lip.

FIGS. 4-8 show an exemplary embodiment of the clamp 52. FIG. 4 shows the clamp 52 disposed in the aligned apertures 34 and 42 before inserting the wedge assembly. The clamp 52 may include a front side 70 and a rear side 72 opposite the front side 70. The clamp 52 may also include a top end 74 and a bottom end 76 opposite the top end 74. The front side 70 of the clamp 52 may include an inclined surface 78 and a plurality of grooves 80 configured to engage the slider 56. The top end 74 of the clamp 52 may include a lifting eye 84 configured to facilitate lifting for installation and removal of the clamp 52 using a crane or other lifting device, or by hand.

The clamp 52 may be generally C-shaped, and the rear side 72 of the clamp 52 may include a pair of clamping arms 82 that extend rearward from the rear side 72. As shown in FIGS. 3 and 4, one of the clamping arms 82, e.g., the clamping arm closer to the top end 74, may include a first inner surface 86, and the other one of the clamping arms 82, e.g., the clamping arm closer to the bottom end 76, may include a second inner surface 88 facing the first inner surface 86. The first inner surface 86 may be configured to face a top surface of the lip shroud 26, and the second inner surface 88 may be configured to contact the lip 24.

A third inner (intermediate) surface 90 may extend between the first inner surface 86 and the second inner surface 88. The third inner surface 90 may include a generally flat surface 92 disposed between two generally curved edge surfaces 94 that extend along a top-bottom direction of the clamp 52. FIG. 7 shows a cross-section of the clamp 52 illustrating a profile of the generally flat surface 92 disposed between the generally curved edge surfaces 94.

The third inner surface 90 may also include a generally curved surface 96 that may be closer to the bottom end 76 (and the clamping arm 82 having the second inner surface 88) than the generally flat surface 92 and the generally curved edge surfaces 94. The generally curved surface 96 may be located between the generally flat surface 92 and the clamping arm 82 having the second inner surface 88. The generally flat surface 92 and the generally curved edge surfaces 94 may be closer to the top end 74 (and the clamping arm 82 having the first inner surface 86) than the generally curved surface 96. The generally flat surface 92 and the generally curved edge surfaces 94 may be located between the generally curved surface 96 and the clamping arm 82 having the first inner surface 86.

FIG. 8 shows a cross-section of the clamp 52 illustrating a profile of the generally curved surface 96. The generally curved surface 96 may be curved with respect to an axis that extends between the top end 74 and the bottom end 76 of the clamp 52 (extending into the page in FIG. 8). The generally curved surface 96 may have a generally constant radius of curvature along the axis. In an embodiment, the generally flat surface 92 may have a length L1 (FIG. 5) along the top-bottom direction of about 20 millimeters to about 60 millimeters (e.g., about 40 millimeters), which may be measured between the first inner surface 86 and the point where the generally flat surface 92 and the generally curved surface 96 meet. In an embodiment, the generally flat surface may have a width W1 (FIG. 5) of about 13 millimeters to about 41 millimeters (e.g., about 27 millmeters). In an embodiment, the generally curved surface 96 may have a length L2 (FIG. 5) of about 36 millimeters to about 110 millimeters (e.g., about 73 millimeters), which may be measured between a point on the second inner surface 88 and the point where the generally flat surface 92 and the generally curved surface 96 meet.

The generally curved edge surfaces 94 may also be curved with respect to respective axes that extend between the top end 74 and the bottom end 76 of the clamp 52 (extending into the page in FIG. 7). The generally curved edge surfaces 94 form curved corners of the clamp 52 on opposite sides of the generally flat surface 92. The first inner surface 86 may be generally perpendicular to the generally flat surface 92, and the second inner surface 88 may be inclined upward toward the front of the clamp 52. Thus, the second inner surface 88 may incline toward the first inner surface 86.

As shown in in FIG. 6, a side profile of the third inner surface 90 may include a side profile of the generally flat surface 92 that forms a line that is collinear with a side profile of the generally curved surface 96. The clamp 52 may taper toward the top end 74, and the inclined surface 78 on the front side 70 of the clamp 52 may be inclined with respect to the side profile of the third inner surface 90.

As shown in FIGS. 3 and 4, when the lip shroud 26 is positioned on the lip 24, the generally flat surface 92 may be configured to contact the rear surface 38 (which may also be generally flat) of the aperture 34 in the lip shroud 26, and the generally curved surface 96 may be configured to face the rear surface 46 (which may also be generally curved) of the aperture 42 in the lip 24. A clearance or gap may be formed between the generally curved surface 96 of the clamp 52 and the generally curved rear surface 46 of the aperture 42. In an embodiment, the clearance may be a radial clearance of less than about 15 millimeters, e.g., about 1 millimeter to about 10 millimeters (e.g., about 10 millimeters).

As shown in FIG. 3, the wedge assembly (e.g., including the wedge 54, the slider 56, the fastener 58, and the cap 60) may be located between the front side 70 of the clamp 52 and the forward surface 44 of the aperture 42 in the lip 24.

Figure 10:
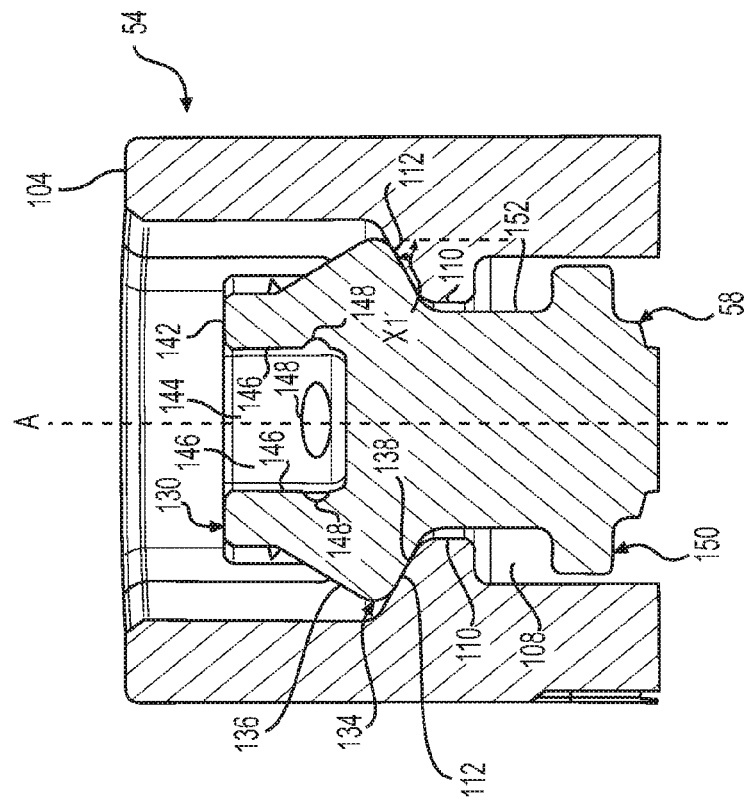
FIG. 10 is a cross-sectional view of the wedge and a fastener of the retention system of FIG. 3.
Figure 9:
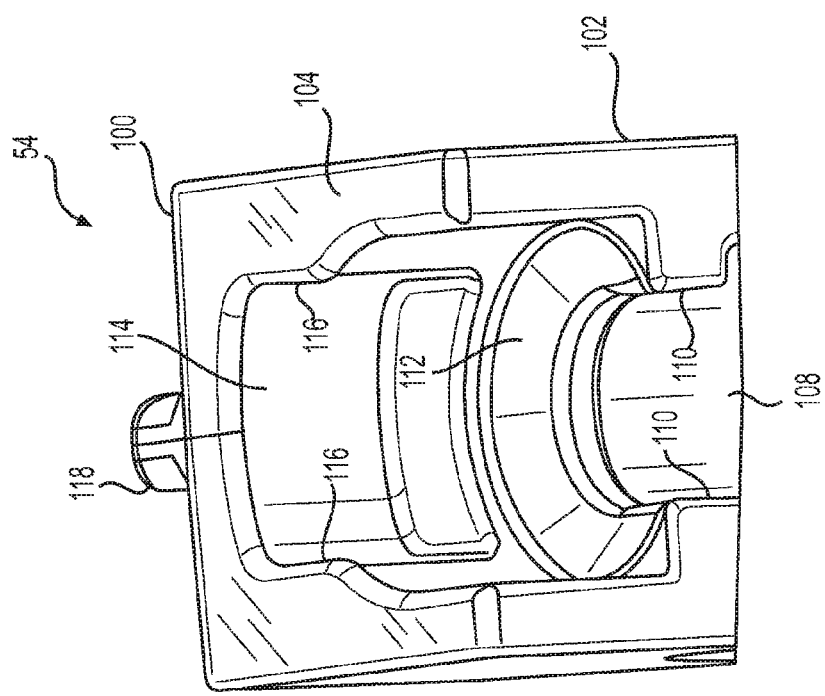
FIG. 9 is a perspective view of a wedge of the retention system of FIG. 3.
Figure 11:
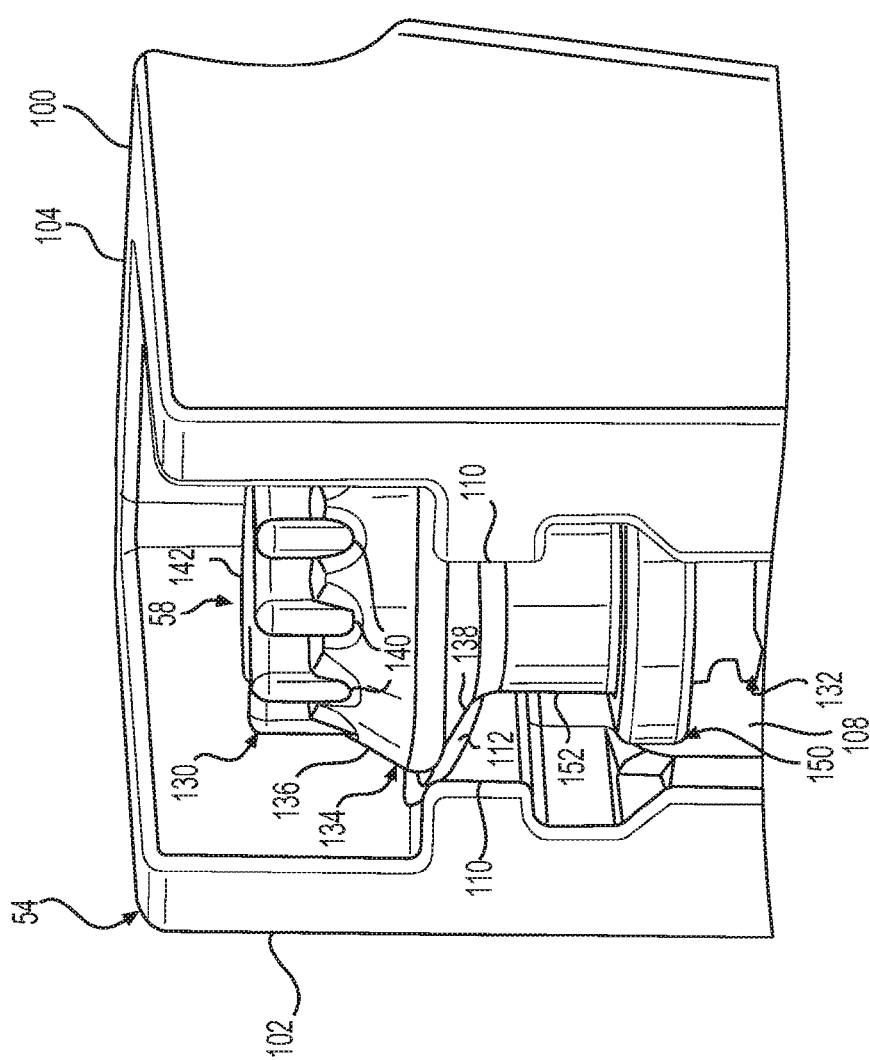
FIG. 11 is a perspective view of the wedge and the fastener of FIG. 10.
Figure 13:
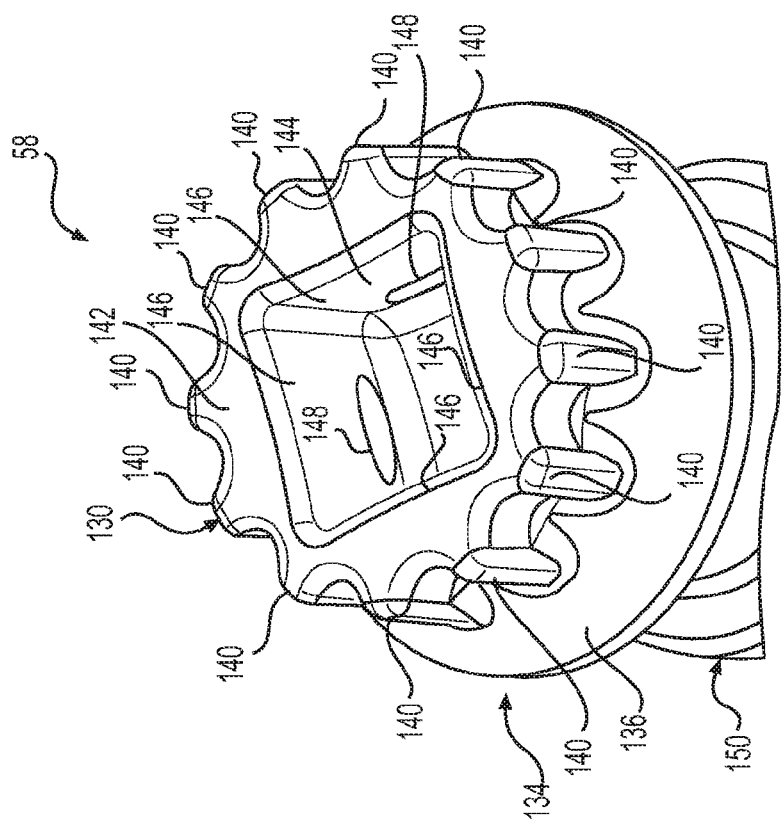
FIG. 13 is a perspective view of the fastener of FIG. 10.
Figure 12:
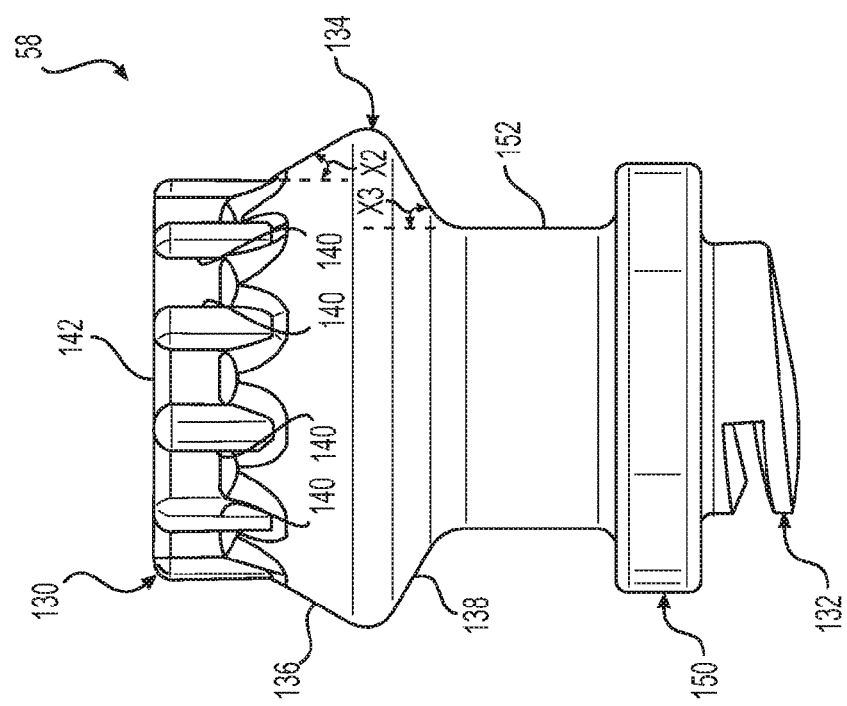
FIG. 12 is a side view of the fastener of FIG. 10.

FIGS. 9-11 show an exemplary embodiment of the wedge 54 of the wedge assembly. The wedge 54 may include a front side 100 and a rear side 102 opposite the front side 100. The wedge 54 may also include a top end 104 and a bottom end 106 (FIG. 3) opposite the top end 104. The wedge 54 may include a recess 108 in the rear side 102, and the recess 108 may extend along an axis A. The axis A may extend between the top end 104 and the bottom end 106.

The wedge 54 may include an annular protrusion 110 that extends into the recess 108. The annular protrusion 110 may include an inclined surface 112 that is inclined at an angle X1 (FIG. 10) with respect to the axis A. In an embodiment, the angle X1 may be an acute angle, e.g., less than 90 degrees, between about 40 degrees to about 80 degrees, or about 60 degrees.

As shown in FIG. 9, the top end 104 of the wedge 54 may include a notch 114 connected to and extending away from the recess 108. The notch 114 may be formed with side walls 116. Also, as shown in FIG. 3, the top end 104 of the wedge 54 may include a lifting eye 118 configured to facilitate lifting for installation and removal of the wedge 54 using a crane or other lifting device, or by hand.

Referring back to FIG. 3, the slider 56 may be at least partially disposed in the recess 108 in the wedge 54. The slider 56 may include teeth 120 that engage the grooves 80 on the front side 70 of the clamp 52.

The slider 56 may also include a throughbore 122 with threads that engage threads on the fastener 58, and the fastener 58 may be rotatable to move the slider 56 along the fastener 58 and along the axis A of the wedge 54, thereby adjusting a position of the wedge 54 with respect to the clamp 52.

FIGS. 10-14 show an exemplary embodiment of the fastener 58. The fastener 58 may be disposed within the recess 108 in the wedge 54 and rotatable with respect to the wedge 54. Also, the fastener 58 may be configured to adjust a position of the wedge 54 with respect to the clamp 52, as will be described below.

The fastener 58 may include a head 130 on a top end and a threaded rod 132 on a bottom end opposite the top end. The threaded rod 132 may be threadably engaged with the threads in the throughbore 122 of the slider 56 and may also have an axis that is generally collinear with the axis A of the recess 108.

The head 130 may include a first collar 134 that may have a top conical surface 136. The top conical surface 136 may taper along the axis A toward the top end of the fastener 58. The top conical surface 136 may be inclined at an angle X2 (FIG. 12) with respect to the axis A. In an embodiment, the angle X2 may be an acute angle, e.g., less than 90 degrees, between about 10 degrees to about 50 degrees, or about 30 degrees.

Figure 14:
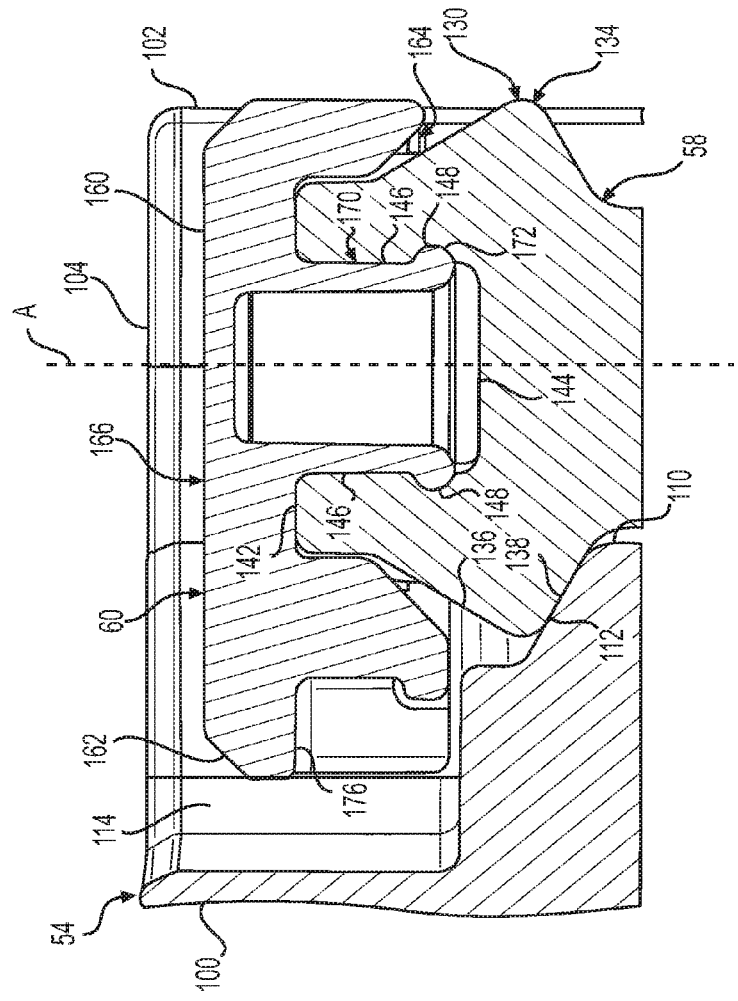
FIG. 14 is a cross-sectional view of the wedge, the fastener, and a cap of the retention system of FIG. 3.

The first collar 134 may also have a bottom conical surface 138 on an opposite side of the first collar 134 from the top conical surface 136. The bottom conical surface 138 may be configured to be supported by and rest against the inclined surface 112 in the wedge 54, as shown in FIGS. 10, 11, and 14. The bottom conical surface 138 may taper along the axis A toward the bottom end of the fastener 58. The bottom conical surface 138 and the inclined surface 112 of the wedge 54 may be disposed at the same angle with respect to the axis A. The bottom conical surface 138 may be inclined at an angle X3 (FIG. 12) with respect to the axis A. In an embodiment, the angle X3 may be an acute angle, e.g., less than 90 degrees, between about 40 degrees to about 80 degrees, or about 60 degrees. In an embodiment, the bottom conical surface 138 and the top conical surface 136 may be separated by an angle of about 90 degrees.

The head 130 of the fastener 58 may also include an alignment feature configured to engage a corresponding alignment feature on the cap 60 to inhibit relative rotation between the head 130 and the cap 60. The alignment feature may include one or more radially-extending gear teeth 140 disposed around the top end of the fastener 58. In the embodiment shown in FIGS. 10-14, the fastener 58 includes twelve gear teeth 140. Alternatively, another number of gear teeth 140 may be provided, depending on the application. The gear teeth 140 may extend radially with respect to the axis A. The gear teeth 140 may also extend from a top surface 142 on the top end of the head 130 to the first collar 134.

The top surface 142 of the head 130 may include an opening 144 that extends into the head 130. The opening 144 may include one or more side walls 146. In an embodiment, the opening 144 may include four side walls 146 (e.g., similar to the opening on a half-inch square drive bolt head), but it is understood that another number of side walls 146 may be provided. Each side wall 146 may be generally flat and may include a cavity 148. Each cavity 148 may be located near a bottom surface of the opening 144 and may be defined by a curved surface.

The head 130 may also include a second collar 150 and a cylindrical portion 152. As shown in FIG. 10, the second collar 150 may include a top surface and a bottom surface that extend generally perpendicularly from the axis A. The second collar 150 may be located between the first collar 134 and the threaded rod 132, and the cylindrical portion 152 may be located between the first collar 134 and the second collar 150. The first collar 134 and the second collar 150 may each have an outer dimension (e.g., outer radius) that is larger than an outer dimension of the cylindrical portion 152. The outer dimension of the first collar 134 may also be larger than the outer dimension of the second collar 150. Further, the outer dimension of the second collar 150 may be larger than the inner dimension of the inclined surface 112 of the wedge 54.

FIGS. 14-19 show an exemplary embodiment of the cap 60. The cap 60 may be removably attached to the head 130 of the fastener 58. The cap 60 may include a main body 160. In the embodiment shown in FIGS. 14-19, the main body 160 may be generally cylindrical and may have an axis that is generally collinear with the axis A. The main body 160 may include a protrusion 162 extending radially away from the main body 160. The protrusion 162 may be configured to extend into the notch 114 in the wedge 54.

The main body 160 may also include an open end 164 and may define a hollow interior. The cap 60 may also include an end section 166 forming a closed end of the main body 160. The axis A may extend between the open end 164 and the closed end of the main body 160. In an embodiment, the cap 60 may be formed from a resilient material and/or a plastic, such as a relatively harder plastic. In an embodiment, the cap 60 may be formed from a thermoplastic polyester elastomer, such as a thermoplastic polyether-ester copolymer having a nominal Shore D durometer hardness of about 55 or about 72, or within the range of about 55 to about 72.

The main body 160 may include an alignment feature that is configured to engage the alignment feature on the head 130 of the fastener 58 to inhibit relative rotation between the cap 60 and the fastener 58. The alignment feature may include one or more gear teeth 168 on a generally cylindrical inner surface of the main body 160. The gear teeth 168 may extend radially with respect to the axis A into the hollow interior and may be configured to engage the gear teeth 140 on the head 130 of the fastener 58 to inhibit relative rotation of the cap 60 and the fastener 58. In the embodiment shown in FIGS. 14-19, the cap 60 includes twelve gear teeth 168. Alternatively, another number of gear teeth 168 may be provided, depending on the application.

The cap 60 may also include a hollow inner portion 170 connecting to an inner surface of the end section 166 and extending through the hollow interior toward the open end 164 of the main body 160. In the embodiment shown in FIGS. 14-19, the inner portion 170 may be generally cylindrical and may have an axis that is generally collinear with the axis A. Thus, the main body 160 and the inner portion 170 may have generally collinear axes. The inner portion 170 may be spaced from the main body 160 and may have a distal end configured to be inserted into the opening 144 in the head 130 of the fastener 58. The distal end of the inner portion 170 may extend outward from the hollow interior of the main body 160.

In the embodiment shown in FIGS. 14-19, the distal end of the inner portion 170 may form a bulbous end section 172.

When the distal end of the inner portion 170 is inserted into the opening 144 in the head 130 of the fastener 58, portions of the bulbous end section 172 may be at least partially disposed in the cavities 148 in the side walls 146 of the opening 144 to help attach and secure the cap 60 to the fastener 58.

The inner portion 170 may include one or more slits 174 extending through a wall of the inner portion 170 parallel to the axis A of the main body 160. The slits 174 may extend through the bulbous end section 172 at the distal end of the inner portion 170. The slits 174 may allow the inner portion 170 to contract sufficiently to allow the insertion of the inner portion 170 into the opening 144 in the head 130 of the fastener 58 and to allow the removal of the inner portion 170 from the opening 144 when removing the cap 60. The slits 174 may extend along at least a majority of a length of the inner portion 170 parallel to the axis A of the inner portion 170. In the embodiment shown in FIGS. 14-19, the inner portion 170 includes six slits 174. Alternatively, another number of slits 174 may be provided, depending on the application.

The cap 60 may also include one or more removal features to aid in prying the cap 60 off of the head 130 of the fastener 58 during adjustment and/or disassembly. The removal feature(s) may include a first removal feature 176 at a distal end of the protrusion 162. The first removal feature 176 may include an indentation or pocket formed in the distal end of the protrusion 162 at the open end 164. A tool (e.g., a flat-head screwdriver or other pry bar) may be inserted into the indentation to engage an upper edge of the indentation, and the handle of the tool may be forced downward against the wedge 54. This action may generate a lifting force on the cap 60 acting through the protrusion 162.

The removal feature(s) may also include a second removal feature 178 on a top surface of the end section 166. The second removal feature 178 may include a puncturable area formed in the end section 166. The puncturable area may have a thickness T2 that is less than a thickness T1 of the end section 166 adjacent the puncturable area. As shown in FIG. 16, the puncturable area may be formed as a plurality of grooves on top of the end surface 166. Also, as shown in FIG. 18, the puncturable area having the thickness T2 may be formed within an area in the end section 166 that is equal to or less than a radius of the inner portion 170 with respect to the axis A. A tool (e.g., a flat-head screwdriver or other pry bar) may be inserted through the puncturable area to lift up on an inner surface of end surface 166. This action may generate a lifting force on the cap 60.

INDUSTRIAL APPLICABILITY

The disclosed tool retention system may be applicable to any work implement having removable GET, such as lip shrouds, wing shrouds, etc. Several advantages may be associated with the disclosed tool retention system. The tool retention system may exhibit improved performance.

To clamp the lip shroud 26 to the lip 24, the clamp 52 may be inserted into the apertures 34 and 42 as shown in FIG. 4. When positioning the clamp 52 in the position shown in FIG. 4, the first inner surface 86 on the clamping arm 82 closer to the top end 74 may face the top surface of the mounting portion 32 of the lip shroud 26, and the generally flat surface 92 of the clamp 52 may be pulled up tight against the generally flat rear surface 38 of the aperture 34 in the lip shroud 26. Because the respective surfaces of the clamp 52 and the lip shroud 26 are generally flat, the clamp 52 may be held in place securely within the apertures 34 and 42 when clamping the lip shroud 26 to the lip 24. The first inner surface 86 on the clamping arm 82 may be separated from the top surface of the mounting portion 32 of the lip shroud 26 by a clearance when the lip shroud 26 is clamped to the lip 24, and the clearance may decrease (e.g., such that the first inner surface 86 may contact the top surface of the mounting portion 32) when material is loaded into the bucket 10.

The generally curved surface 96 of the clamp 52 may be spaced at a radial clearance from the generally curved rear surface 46 of the aperture 42 in the lip 24. The clearance may be sufficient to allow the clamp 52 to be pulled back when the fastener 58 is rotated to urge the clamp 52 tighter against the lip shroud 26 and the lip 24, and small enough to allow the retention system 50 to be relatively compact. As a result, providing both the generally flat surface 92 and the generally curved surface 96 on the rear side 72 of the clamp 52 (e.g., on the third inner surface 90) allows the clamp 52 to maintain a relatively stable and secure positioning of the clamp 52 with respect to the generally flat rear surface 38 of the aperture 34 in the lip shroud 26, while also maintaining a sufficient clearance between the clamp 52 and the generally curved rear surface 46 of the aperture 42 in the lip 24 to allow the clamp 52 to be pulled back when the fastener 58 is rotated to urge the clamp 52 tighter against the lip shroud 26 and the lip 24.

After inserting the clamp 52 into the apertures 34 and 42, the wedge assembly may also be inserted into the apertures 34 and 42 and positioned alongside the clamp 52 to hold the clamp 52 in place, as shown in FIG. 3. The wedge assembly may be inserted with the slider 56 and the fastener 58 positioned within the the recess 108 of the wedge 54. The rear side 102 of the wedge 54 may face the front side 70 of the clamp 52 and the teeth 120 on the slider 56 may engage the grooves 80 on the clamp 52 upon insertion of the wedge 54 into the apertures 34 and 42. The front side 100 of the wedge 54 may contact the forward surface 44 of the aperture 42 and may be generally parallel to the generally flat surface 92 of the clamp 52.

The fastener 58 may then be rotated to urge the clamp 52 tighter against the lip shroud 26 and the lip 24. As the fastener 58 is rotated and the slider 56 moves along the fastener 58, the wedge 54 is forced into the apertures 34 and 42. The movement of the wedge 54 may correspond with the pull-back forces generated by the clamp 52 on the lip shroud 26 and the lip 24 such that, as the wedge 54 is forced further into the apertures 34 and 42, the clamp 52 is urged tighter against the lip shroud 26 and the lip 24.

The fastener 58 may be rotatably disposed in the wedge 54 and centered in the recess 108 by the annular protrusion 110. The bottom conical surface 138 of the first collar 134 on the fastener 58 may contact and be supported on the inclined surface 112 of the annular protrusion 110 to maintain the fastener 58 in a centered position in the recess 108. As a result, stresses on the fastener 58 may be reduced, which may allow for higher torques on the fastener 58.

To loosen the connection between the lip shroud 26 and the lip 24, the fastener 58 may be rotated in the opposite direction to move the wedge 54 upward from the apertures 34 and 42. Thus, the fastener 58 may be configured to adjust a position of the wedge 54 with respect to the clamp 52, and the retention system 50 may allow the lip shroud 26 to be removably connected to the lip 24 by rotation of the fastener 58.

When removing the wedge assembly from the apertures 34 and 42, the fastener 58 may be rotated a sufficient amount to allow the second collar 150 on the fastener 58 to abut the bottom surface of the annular protrusion 110. The fastener 58 and the slider 56 may then be lifted with the wedge 54, e.g., using the lifting eye 118.

After obtaining the desired pull-back force, the cap 60 may be attached to the head 130 of the fastener 58 to form a relatively secure fastening system. As described above, the gear teeth 168 in the cap 60 may engage the gear teeth 140 on the head 130 of the fastener 58, and the inner portion 170 of the cap 60 may be inserted into the opening 144 in the head 130 of the fastener 58. The slits 174 in the inner portion 170 may allow the inner portion 170 to contract sufficiently to allow the insertion of the inner portion 170 into the opening 144, and portions of the bulbous end section 172 may snap into place in the cavities 148 in the opening 144. As a result, when material is loaded or unloaded from the bucket 10, the cap 60 may assist in allowing the flow of material (e.g., concrete, dust, etc.) to flow over the retention system 50. The flow of material may be prevented from lodging in and around the head 130 of the fastener 58 (e.g., in the opening 144, in the recess 108 and the notch 114 in the wedge 54, etc.). When adjustment and/or disassembly of the retention system 50 is desired, the cap 60 may be removed and the fastener 58 may be rotated without (or with less) cleaning around the head 130, e.g., by using a tool to remove the material. Also, snapping the bulbous end section 172 into the cavities 148 in the opening 144 may provide a relatively secure and detachable connection between the cap 60 and the fastener 58.

Figure 15:
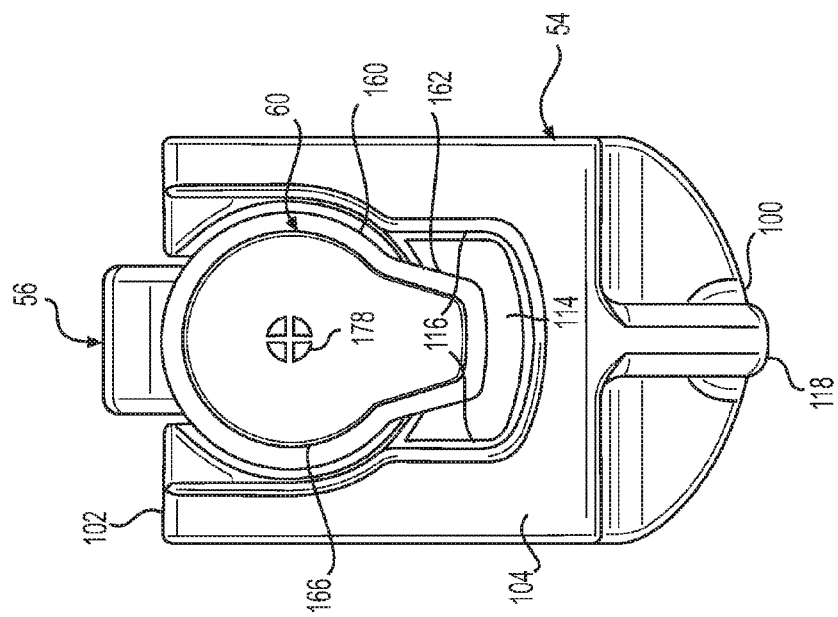
FIG. 15 is a top view of the wedge and the cap of FIG. 14.

When the cap 60 is attached to the head 130 of the fastener 58, the protrusion 162 may be configured to extend into the notch 114 in the wedge 54, as shown in FIG. 15. The side walls 116 of the notch 114 may prevent or limit rotation of the protrusion 162 around the axis A (FIG. 14), which may also prevent or limit rotation of the cap 60 (and corresponding rotation of the fastener 58 due to the engagement of the gear teeth 140 and 168). As a result, the cap 60 may prevent or limit inadvertent rotation of the fastener 58 and may lock the fastener 58 in place. Also, the cap 60 may be removed relatively easily by inserting a tool into either the first removal feature 176 or the second removal feature 178.

It will be apparent to those skilled in the art that various modifications and variations can be made to the disclosed tool retention system. Other embodiments will be apparent to those skilled in the art from consideration of the specification and practice of the disclosed tool retention system. It is intended that the specification and examples be considered as exemplary only, with a true scope being indicated by the following claims and their equivalents.

What is claimed is:

1. A cap for removably attaching to a head of a fastener, the cap comprising:
   a main body having a generally cylindrical configuration, defining a circumferential direction, a radial direction and an axis, the main body also including an open end and defining a hollow interior;
   an end section forming a closed end of the main body;
   a hollow inner portion connecting to an inner surface of the end section, the hollow inner portion including a generally cylindrical configuration with an axis collinear with the axis of the main body, the hollow inner portion extending through the hollow interior toward the open end of the main body, the inner portion being spaced from the main body, the inner portion having a distal end configured to be inserted into an opening in the head of the fastener, the distal end of the inner portion extending axially outward from the hollow interior past the open end of the main body and the distal end of the inner portion including a bulbous section at the distal end facing radially outwardly; and
   a lever arm extending radially away from the main body defining a distal end.

2. The cap of claim 1, wherein the inner portion includes at least one slit extending through a wall of the inner portion parallel to the axis of the main body, the at least one slit extending through the distal end of the inner portion.

3. The cap of claim 2, wherein the main body includes a plurality of gear teeth and the inner portion defines at least one slit that extends along at least a majority of a length of the inner portion along its axis and is circumferentially aligned with a gear tooth.

4. The cap of claim 1, further including a removal feature formed at a distal end of the lever arm, the removal feature including an indentation formed in the distal end of the lever arm.

5. The cap of claim 1, further including a removal feature formed in the end section, the removal feature includes a puncturable area formed in the end section, the puncturable area having a thickness that is less than a thickness of the end section adjacent the puncturable area.

6. The cap of claim 5, wherein the puncturable area includes a plurality of grooves formed in the end section within a radius that is equal to or less than a radius of the inner portion.

7. A fastening system comprising:
   a fastener including a head on one end, the head including an opening with a side wall with a radially extending cavity, the head also including a plurality of gear teeth, and
   a cap removably attached to the head of the fastener, the cap including:
      a main body having a generally cylindrical configuration, defining a circumferential direction, a radial direction, and an axis, the main body also including an open end and defining a hollow interior, the main body including a plurality of gear teeth extending into the hollow interior and configured to engage the plurality of gear teeth on the head of the fastener to inhibit rotation thereof,
      an end section forming a closed end of the main body, and
      a hollow inner portion connecting to an inner surface of the end section, the hollow inner portion including a generally cylindrical configuration with an axis collinear with the axis of the main body, the hollow inner portion extending through the hollow interior toward the open end of the main body, the inner portion being spaced from the main body, the inner portion having a distal end configured to be inserted into the opening in the head of the fastener, the distal end of the inner portion extending axially outward from the hollow interior past the open end of the main body and the distal end of the inner portion including a bulbous section at the distal end facing radially outwardly configured to engage a cavity disposed in the opening of the head of the fastener to retain the cap on the head of the fastener.

8. The fastening system of claim 7, wherein the inner portion of the cap includes at least one slit extending through a wall of the inner portion and through the bulbous end section, the at least one slit extending parallel to the axis of the inner portion and being aligned circumferentially with a gear tooth of the cap.

9. The fastening system of claim 7, wherein the cap further includes a removal feature with a puncturable area formed in the end section, the puncturable area having a thickness that is less than a thickness of the end section adjacent the puncturable area.

10. A retention system for clamping a tool to a work implement, the retention system comprising:
  a clamp configured to be disposed within an aperture in the work implement and an aperture in the tool to clamp the tool to the work implement; and
  a wedge assembly located between the clamp and a surface of the aperture in the work implement, the wedge assembly being adjustably positionable with respect to the clamp, the wedge assembly including:
    a wedge including a recess,
    a fastener disposed within the recess in the wedge and configured to adjust a position of the wedge with respect to the clamp, the fastener including a head on one end, the head including an opening with a plurality of side walls each with a radially extending cavity, the head also including a plurality of gear teeth, and
    a cap removably attached to the head of the fastener, the cap including:
      a main body having a generally cylindrical configuration, defining a circumferential direction, a radial direction, and an axis, the main body also including an open end and defining a hollow interior, the main body including a plurality of gear teeth extending into the hollow interior and configured to engage the plurality of gear teeth on the head of the fastener to inhibit rotation thereof,
      an end section forming a closed end of the main body, and
      a hollow inner portion connecting to an inner surface of the end section, the hollow inner portion including a generally cylindrical configuration with an axis collinear with the axis of the main body, the hollow inner portion extending through the hollow interior toward the open end of the main body, the inner portion being spaced from the main body, the inner portion having a distal end configured to be inserted into the opening in the head of the fastener, the distal end of the inner portion extending axially outward from the hollow interior past the open end of the main body and the distal end of the inner portion including a bulbous section split into separate portions by a plurality of slits at the distal end, the bulbous section portions facing radially outwardly configured to engage a cavity disposed on a side wall in the opening of the head of the fastener to retain the cap on the head of the fastener.

11. The retention system of claim 10, wherein:
the plurality of slits are circumferentially aligned with the gear teeth of the cap.

12. The retention system of claim 10, wherein:
the inner portion of the cap is generally cylindrical and extends along an axis; and
the cap further includes a removal feature with a puncturable area formed in the end section, the puncturable area having a thickness that is less than a thickness of the end section adjacent the puncturable area and having a radius that is less than or equal to a radius of the inner portion with respect to the axis.

\* \* \* \* \*